United States Patent [19]
Ishii

[11] Patent Number: 4,839,748
[45] Date of Patent: Jun. 13, 1989

[54] INITIAL STATE SETTING SYSTEM FOR STILL PICTURE RECORDING/REPRODUCTION DEVICE

[75] Inventor: Tsuneo Ishii, Saitama, Japan

[73] Assignee: Pioneer Electronic Corporation, Tokyo, Japan

[21] Appl. No.: 99,380

[22] Filed: Sep. 21, 1987

[30] Foreign Application Priority Data

Sep. 20, 1986 [JP] Japan ................................. 61-222739

[51] Int. Cl.⁴ ..................... H04N 5/781; H04N 5/907; H04N 5/93
[52] U.S. Cl. .................................. 360/10.1; 358/312; 358/342; 360/32
[58] Field of Search ....................... 360/10.1, 32, 10.2, 360/10.3; 358/312, 342

[56] References Cited

U.S. PATENT DOCUMENTS

4,430,675 2/1984 Fujime ................................. 360/9.1
4,477,843 10/1984 Kinjo et al. ......................... 360/10.1
4,583,131 4/1986 Dakin ................................. 360/10.1

Primary Examiner—Marvin L. Nussbaum
Attorney, Agent, or Firm—Sughrue, Mion, Zinn, Macpeak & Seas

[57] ABSTRACT

An initial state setting system in a still picture recording and reproduction device in which a video signal is read from a disk and written into a memory and then repeatedly read from the memory for still picture display. When power is first applied to the device characterizing information recorded on the disk is immediately read into the memory.

5 Claims, 8 Drawing Sheets

| AUDIO | | VIDEO | |
|---|---|---|---|
| DISPOSITION NO. | EVENT NO. | DISPOSITION NO. | EVENT NO. |
| 0 | 83 | 0 | 202 |
| 1 | 84 | 1 | 201 |
| 2 | 85 | 2 | 199 |
| 3 | 86 | 3 | 105 |
| 4 | 1 | 4 | 106 |
| 5 | 2 | 5 | 10 |
| ⋮ | ⋮ | ⋮ | ⋮ |
| n | | n | |

FIG. 9

INITIAL STATE SETTING SYSTEM FOR STILL PICTURE RECORDING/REPRODUCTION DEVICE

The present invention relates to an initial state setting system for a still picture recording/reproduction device.

DESCRIPTION OF THE PRIOR ART

An optical recording disk, which is of the direct-read-after-write type (which is hereinafter abbreviated as the DRAW type) and on which a user can write what he wants to write, has advantages (a), (b) and (c) (mentioned below) over a recording medium such as a magnetic recording disk.

(a) The optical recording disk is less likely to be adversely affected by dust.

(b) The cost of the optical recording disk per binary digit is lower.

(c) The density of recording on the optical recording disk is higher so that a larger amount of information can be recorded thereon.

A still picture recording/reproduction device, in which an optical recording disk driver which functions to record information in an appointed position on an optical recording disk of the DRAW type and reproduce recorded information in an appointed position can be used to record and reproduce a still picture, has been proposed. The still picture recording/reproduction device has a memory in which data including an amount of video information for a frame can be stored. The memory is used as a data buffer so that data including video information are transferred to the optical recording disk driver and recorded in the optical recording disk driver and recorded on the optical recording disk of the DRAW type and that the data recorded on the disk are reproduced and stored in the memory. The data area is repeatedly read from the memory to reproduce a still picture.

As for the still picture recording/reproduction device, it is presumable that a program which indicates that a sequence of reproduction of a plurality of groups of data recorded on the optical recording disk is stored in a random access memory or the like. However, if the program is stored in the random access memory or the like, a complicated manual operation needs to be done to input the program every time the disk is replaced. For that reason, it is not preferable to store the program in the random access memory or the like.

SUMMARY OF THE INVENTION

Accordingly, it is an object of the present invention to provide an initial state setting system for a still picture recording/reproduction device, in which a pattern including information peculiar to a optical recording disk can be reproduced as a still picture immediately after the application of electric power to the device.

The initial state setting system for the still picture recording/reproduction device, in accordance with the present invention, is characterized in that data including prescribed video information are previously recorded in a prescribed recording position on the recording disk. The data previously recorded in the prescribed recording position are read and written into a still picture reproduction memory immediately after the application of electric power to the device so as to set the stored contents of the memory in an initial state.

DETAILED DESCRIPTION OF THE PREFERRED EMBODIMENT

An embodiment of the present invention, which is a programmed reproduction system for a still picture recording/reproduction device, is hereafter described in detail with reference to the drawings attached hereto.

Figure 1:
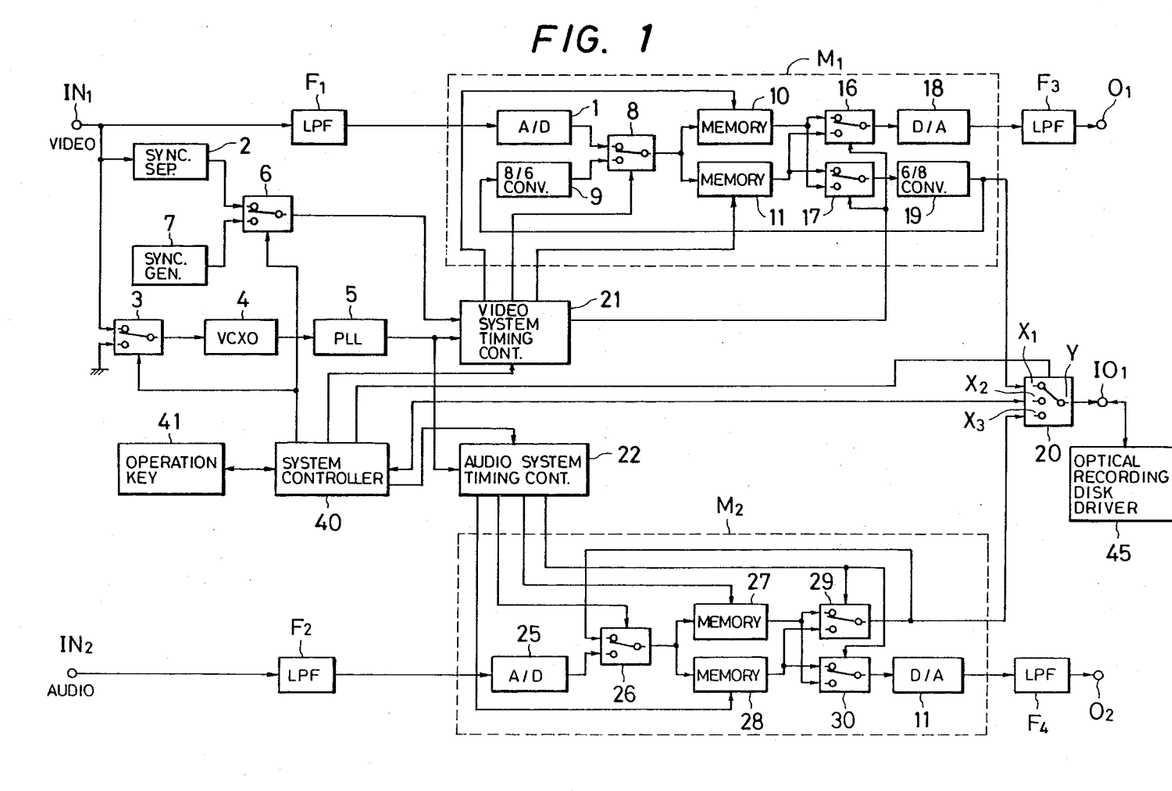
FIG. 1 shows a block diagram of a still picture recording/reproduction device provided in accordance with the present invention.

In FIG. 1, a video signal and an audio signal which are sent out from a video tape recorder (not shown) or the like are supplied to input terminals $IN_1$ and $IN_2$, respectively. The video signal supplied to the input terminal $IN_1$ is applied to the A/D converter 1 of a video memory circuit $M_1$ through a low-pass filter $F_1$, and is also applied to a synchronizing signal separator 2 and one input terminal of a switch 3 whose other input terminal is grounded. The synchronizing signal separator 2 separates a horizontal and a vertical synchronizing signals from the video signal and sends out a E/O signal indicating an odd-numbered field or an even-numbered field.

The switch 3 functions to selectively send out the video signal or a ground-level signal depending on a timing change over command. The signal sent out from the output terminal of the switch 3 is supplied to a clock signal generation circuit 4.

When the video signal is sent out from the switch 3, the clock signal generation circuit 4 produces a clock signal synchronized with a color subcarrier included in the video signal. When the ground-level signal is sent out from the switch 3, the clock signal generation circuit 4 produces a clock signal of free running frequency. The clock signal produced by the circuit 4 is supplied to a phase-locked loop circuit 5 which generates a clock signal $3f_{sc}$ whose frequency is three times as much as that of the color subcarrier.

The horizontal and the vertical synchronizing signals and the E/O signal, which are sent out from the synchronizing signal separator 2, are supplied to one input terminal of a switch 6 whose other input terminal receives an E/O signal and a horizontal and a vertical synchronizing signals produced by a synchronizing signal generation circuit 7. Similarly to the switch 3, the switch 6 functions to selectively send out the E/O signal and the horizontal and the vertical synchronizing signals received from the synchronizing signal separator 2 or the synchronizing signal from the generation circuit 7, depending on a timing change over command.

The A/D converter 1 samples the video signal at a predetermined frequence (e.g., at a frequence equal to the clock signal $3f_{sc}$), and changes the sampled value into 6-bit digital data which are supplied to one input terminal of a switch 8 whose other input terminal receives output data from an 8/6 converter 9 which changes 8-bit data into 6-bit data. The switch 8 functions to selectively send out the output data from the A/D converter 1 or the 8/6 converter 9, depending on a memory input changeover command. The data sent out from the output terminal of the switch 8 are entered into memories 10 and 11.

The data read from the memories 10 and 11 are supplied to one input terminal of each of switches 16 and 17 which function so that the data read from the memory 10 or 11 are selectively sent out from the switch depending on a memory changeover command. The data sent out from the output terminals of the switches 16 and 17 are supplied to a D/A converter 18 and a 6/8 converter 19.

The data read from one of the memories 10 and 11 are changed into an analog signal by the D/A converter 18 so that a video signal is generated and supplied to a video output terminal 01 through a low-pass filter $F_3$.

The 6/8 converter 19 changes 6-bit data into 8-bit data. The output terminal of the 6/8 converter 19 is connected to the input terminal of the 6/8 converter 19 and the input/output terminal $x_1$ of a switch 20.

A video system timing controller 21 performs the address control of the memories 10 and 11 of the video memory circuit $M_1$ and the changeover control of the switches 8, 16 and 17 thereof. The controller 21 receives the horizontal and the vertical synchronizing signals and the E/O signal from the switch 6, the clock signal $3f_{sc}$ from the phase-locked loop circuit 5 and various kinds of commands from a system controller 40.

The audio signal supplied to the input terminal IN2 is supplied to the A/D converter 25 of an audio memory circuit $M_2$ through a low-pass filter $F_2$. The A/D converter 25 samples the audio signal at a predetermined frequency (e.g., at a frequency corresponding to the clock signal $3f_{sc}$ or some multiple or subdivision thereof), and changes the sampled value into 8-bit digital data which are supplied from the A/D converter to one input terminal of a switch 26 which functions so that data supplied to one of two input terminals of the switch are selectively sent out from the switch depending on an audio memory input changeover command. The data sent out from the output terminal of the switch 26 are entered into memories 27 and 28.

Data read from the memories 27 and 28 are supplied to one input terminal of each of switches 29 and 30 which function so that the data read from the memory 27 or 28 are selectively sent out from the switches depending on an audio memory changeover command, the output terminal of the switch 29 is connected to the other input terminal of the switch 26 and the input/output terminal $x_3$ of the switch 20. The data sent out from the output terminal of the switch 30 are supplied to a D/A converter 31 which changes the data into an analog signal so that an audio signal is generated and supplied to an audio output terminal $O_2$ through a low-pass filter $F_4$.

An audio system timing controller 22 performs the address control and mode control of the memories 27 and 28 of the audio memory circuit M2 and the changeover control of the switches 26, 29 and 30 thereof. The audio system timing controller 22 receives the clock signal $3f_{sc}$ from the phase-locked loop circuit 5 and various kinds of commands from the system controller 40.

The input/output terminal $X_2$ of the switch 20 is connected to the data input/output terminal of the system controller 40.

The system controller 40 is made of a microcomputer comprising a processor, a ROM, a RAM and so forth, receives data corresponding to the manipulation of the keys of a control panel 41, data sent out from the input/output terminal x2 of the switch 20 and so forth, and processes the received data in accordance with a program previously stored in the ROM, to control various sections of the reproduction system.

The input/output terminal y of the switch 20 is connected to an optical recording disk driver 45 through an input/output terminal $IO_1$ and an interface cable (not shown). A signal line (not shown) for transmitting a control signal for controlling the timing of the sending and reception of data to and from the optical recording disk driver 45 is connected between the system controller 40 and the input/output terminal $IO_1$.

Figure 2:
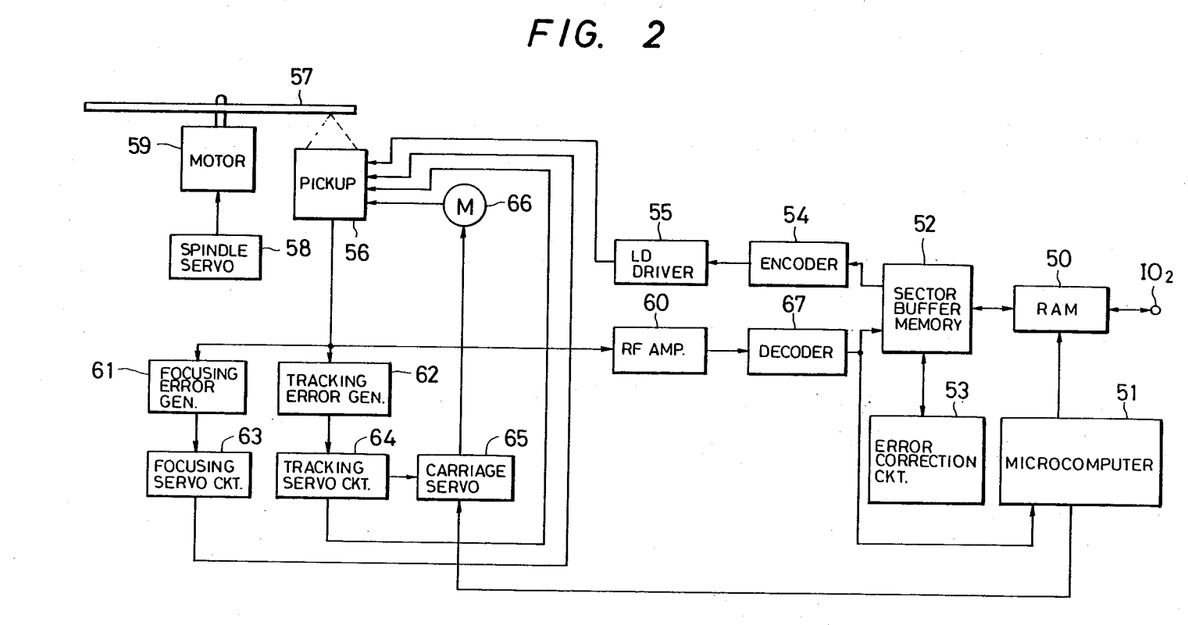
FIG. 2 shows a block diagram of the optical recording disk driver of the still picture recording/reproduction device.

FIG. 2 shows a block diagram of the optical recording disk driver 45. Data supplied to an input/output terminal $IO_2$ through an interface cable (not shown) are sent to a RAM 50. A microcomputer 51 performs the address control and mode control of the RAM 50 so that the data supplied from the input/output terminal $IO_2$ are sequentially written into the RAM. The data written into the RAM 50 are sequentially read therefrom and supplied to a sector buffer memory 52 capable of storing an amount of data which are loaded in one sector of a disk 57. An error correction circuit 53 performs the address control and mode control of the sector buffer memory 52 so that the data read from the RAM 50 are sequentially written into the sector buffer memory, parity bits are added to the data written into it, and the data provided with the parity bits are sequentially read from it. The data read from the sector buffer memory 52 are supplied to an encoder 54 and converted into codes which are supplied to a laser diode driver 55 so that the quantity of light from a laser diode (not shown) provided in a pickup 56 is altered depending on the input data, the laser light being used to record the data on the disk 57.

The disk 57 is rotated by a spindle motor 59 whose driving is controlled by a spindle servo circuit 58 so that the angular velocity, for example, of the motor is kept constant.

The data recorded on the disk 57 are read therefrom through the pickup 56. In the pickup 56, an objective lens, a focusing actuator, a tracking actuator, a photosensor (all not shown) and so forth are provided in addition to the laser diode (not shown). The output from the pickup 56 is supplied to an RF amplifier 60, a focusing error generation circuit 61 and a tracking error generation circuit 62.

The focusing error generation circuit 61 produces a focusing error signal by an astigmatic method, for example. The tracking error generation circuit 62 produces a tracking error signal by a push-pull method or a three-beam method, for example. The focusing error signal and the tracking error signal are converted into drive signals for the focusing actuator (not shown) and the tracking actuator (not shown) in the pickup 56 by a focusing servo-amplifier 63 and a tracking servo-amplifier 64. The drive signals act so that laser light emitted from the laser diode in the pickup 56 is converted into an information detecting light spot on the recording surface of the disk 57 and the light spot is positioned in the guide groove (not shown) of the disk in the radial direction of the disk.

The drive signal sent out from the tacking servo-amplifier 64 is supplied to a carriage servo circuit 65 to perform the amplification and phase compensation of the drive signal. The output from the carriage servo circuit 65 acts as a drive signal for a carriage motor 66. A carriage or sliding mechanism (not shown), holding the pickup 56 and movable in the radial direction of the disk 57 is driven by the carriage motor 66 so that the tracking actuator in the pickup is positioned at the middle point of a range of mobility.

An RF signal sent out from the RF amplifier 60 is supplied to a decoder 67 to demodulate the data recorded on the disk 57. After demodulation, data sent out from the decoder 67 are sequentially written into the sector buffer memory 52, and error correction and reading are performed. Data read from the sector buffer memory 52 are sequentially written into RAM 50. The data written into the RAM 50 are sequentially read therefrom by the microcomputer 51 and supplied to the input/output terminal $IO_2$ together with a control signal for controlling the timing of sending and reception of data.

The microcomputer 51 receives the output data from the decoder 67 and finds out the position of the information detecting point of the pickup 56 in terms of address information included in the output data. The microcomputer 51 then sends out an access search command to the carriage servo circuit 65 on the basis of data which are supplied to the input/output terminal $IO_2$, and appoints a recording position. As a result, the information detecting point is moved with a jump in the radial direction of the disk 57 to write or read data in the appointed recording position.

Figure 3:
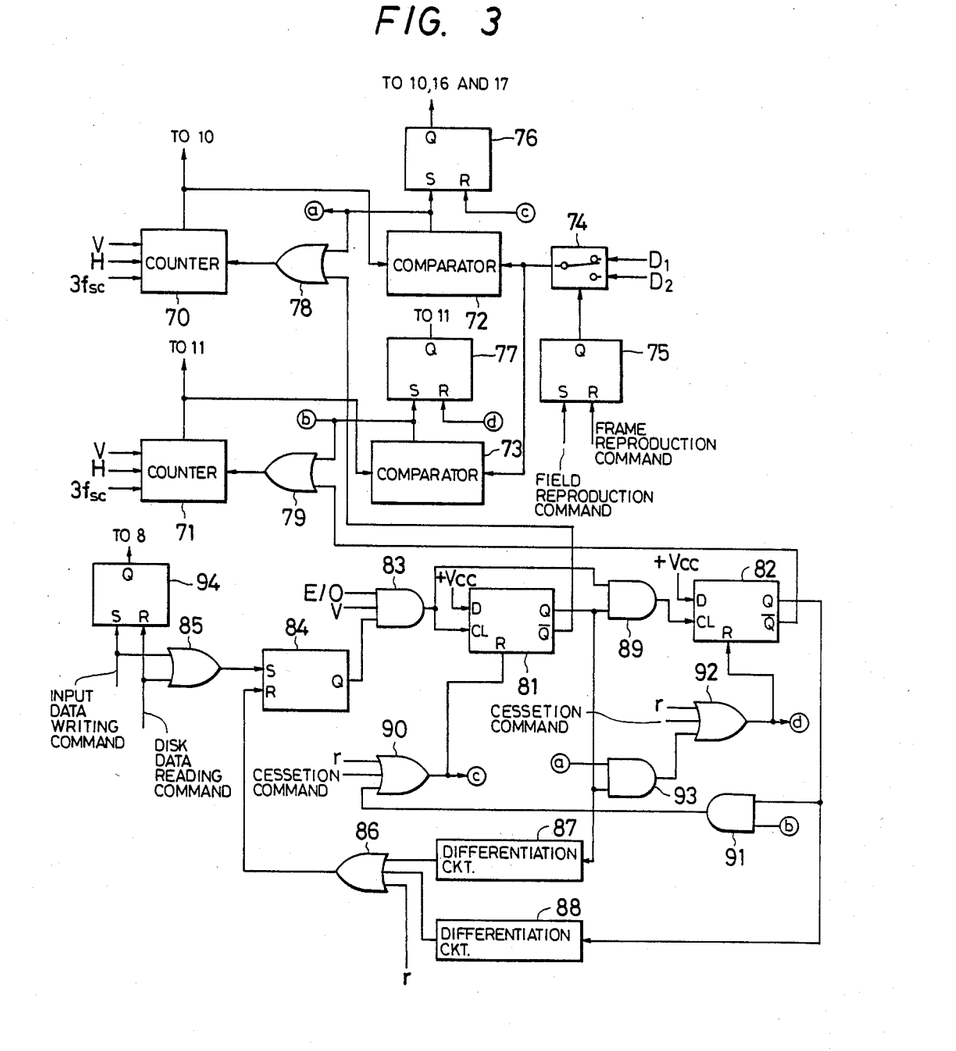
FIG. 3 shows a block diagram of the circuit construction of the video system timing controller of the still picture recording/reproduction device.

FIG. 3 shows a block diagram of the video system timing controller 21. The horizontal and the vertical synchronizing signals from the switch 6 and the clock signal $3f_{sc}$ from the phase-locked loop circuit 5 are supplied to counters 70 and 71, each of which comprises a binary counter which increasingly counts the clock signal $3f_{sc}$ and is reset by the horizontal synchronizing signal, another binary counter which increasingly counts the horizontal synchronizing signal and is reset by the vertical synchronizing signal, and still another binary counter which is increasingly counts the vertical synchronizing signal. The output data from the counters 70 and 71 are address input data to the memories 10 and 11, respectively.

The output data from the counters 70 and 71 are also supplied to comparators 72 and 73 which compare the output data with those from a switch 74 which is supplied with data $D_1$ and $D_2$ are equal to those sent out from the counter 70 when an amount of Video data for a field is written into the memory 10. The switch 74 functions so that the data $D_1$ or $D_2$ are selectively sent out from the switch depending on a data changeover command signal sent out from the Q output terminal of a flip-flop 75a. A field reproduction command is applied from the system controller 40 to the setting input terminal of the flip-flop 75. A frame reproduction command is applied from the system controller 40 to the resetting input terminal of the flip-flop 75.

The comparators 72 and 73 send out high-level signal when the output data from the counters 70 and 71 coincide with the data from the switch 74. The outputs from the comparators 72 and 73 are supplied to the setting input terminal of flip-flops 76 and 77, the Q outputs from which are supplied to the mode control input terminals of the memories 10 and 11 so that the memories are shifted from a writing mode to a reading mode when the flip-flops are put in a set state. The Q output from the flip-flop 76 is also supplied to the control input terminals of the switches 16 and 17 of the video memory circuit $M_1$.

The outputs from the comparators 72 and 73 are also supplied to the resetting input terminals of the counters 70 and 71 through OR gates 78 and 79. The Q outputs from D-type flip-flops 81 and 82 are supplied to the resetting input terminals of the counters 70 and 71 through the OR gates 78 and 79. The output from an AND gate 83 is supplied to the clock signal input terminal of the flip-flop 81. The voltage of a power supply is applied to the D input terminal of the flip-flop 81. The vertical synchronizing signal and the E/O signal from the switch 6 and the Q output from a flip-flop 84 are supplied to the AND gate 83. An input data writing command and a disk data writing command are sent out from the system controller 40 to the setting input terminal of the flip-flop 84 through an OR gate 85. The outputs from differentiation circuits 87 and 88 and a resetting signal r generated at the time of power application or the like are supplied to the resetting input terminal of the flip-flop 84 through an OR gate 86. The Q outputs from the flip-flops 81 and 82 are supplied to the differentiation circuits 87 and 88.

The outputs from an AND gate 89 is supplied to the clock signal input terminal of the flip-flop 82. The voltage of a power supply is applied to the D input terminal of the flip-flop 82. The output from the AND gate 83 and the Q output from the flip-flop 81 are supplied to the AND gate 89. The resetting signal 4, a cessation command from the system controller 40 and the output from an AND gate 91 are supplied to the resetting input terminal of the flip-flop 81 through an OR gate 90. The Q output from the flip-flop 82 and the output from the comparator 73 are supplied to the AND gate 91. The output from the OR gate 90 is supplied to the resetting input terminal of the flip-flop 76 as well.

The resetting signal r, the cessation command from the system controller 40 and the output from an AND gate 93 are supplied to the resetting input terminal of the flip-flop 82 through OR gate 92. The Q output from the flip-flop 81 and the output from the comparator 72 are supplied to the AND gate 93. The output from the OR gate 92 is supplied to the resetting input terminal of the flip-flop 77 as well.

The input data writing command and the disk data writing command from the system controller 40 are applied, respectively, to the setting input terminal and resetting input terminal of a flip-flop 94. The Q output from the flip-flop 94 is supplied as a control input to the switch 8.

When the input data writing command is applied from the system controller 40 of the video system timing controller 21, the flip-flop 94 is put in a set state so that the level of the Q output supplied as a control input to the switch 8 from the flip-flop becomes high. At that time, the output data from the A/D converter 1 are selectively sent out from the switch 8 so that data corresponding to the video signal supplied to the input terminal $IN_1$ are sent to the memories 10 and 11 and written into them.

When the disk data writing command is applied from the system controller 40 to the video system timing controller 21, the flip-flop 94 is put in a reset state so that data sent out from the optical recording disk driver 45 are supplied to the memories 10 and 11 and written into them.

When one of the input data writing command and the disk data writing command is applied from the system controller 40 to the video system timing controller 21, the flip-flop 84 is put in a set state so that the flip-flop 81 is put in a set state so that the flip-flop 81 is put in a set state synchronously with the vertical synchronizing signal, the resetting input to the counter 70 vanishes and the counter starts counting. As a result, the writing of data into the memory 10 is started. At that time, if the frame reproduction command is being applied to the video system timing controller 21 so that the data $D_1$ are supplied to the comparator 72, the output data from the counter 70 coincide with the data $D_1$ at the time of completion of writing of an amount of data from a frame into the memory 10 so that the comparator 72 sends out a high-level signal. In that case, the flip-flop 76 is put in a set state so that the memory 10 is put in a reading mode, the count of the counter 70 is reset and the counter thereafter continues counting. As a result, the reading of the amount of data for the frame written into the memory 10 is started. When the amount of data for the frame is all read from the memory 10, the count of the counter 70 is reset and the counter thereafter continues counting, similarly to the case of the data writing. The reading of an amount of data for a frame from the memory 10 is thus repeated.

If the data $D_2$ are being supplied to the comparator 72 in accordance with the field reproduction command, an amount of data for a field is written into the memory 10 and the reading of an amount of data for a field is repeated.

When the input data writing command or the disk data writing command is applied to the video system timing controller 21 during the reading of data from the memory 10, the flip-flop 82 is put in a set state so that the counter 71 starts counting and the writing of data into the memory 11 is begun. At the end of the writing of the data into the memory 11, the flip-flop 81 is put in a reset state so that the reading of the data from the memory 10 is stopped.

Since the audio system timing controller 22 is constituted similarly to the video system timing controller 21, the constitution of the audio system timing controller 21, the constitution of the audio system timing controller 21, the constitution of the audio system timing controller is not specified herein.

The operation of the processor of the system controller 40 is hereafter described with reference to flow charts shown in FIGS. 4, 5, 6 and 7. When power is applied, the processor proceeds to a step S1 so that the registers and so forth of the processor are set in an initial state. The processor then proceeds to a step S2 so that peripheral circuits such as the video system timing controller 21 are set in an initial state. The processor then proceeds to a step S2' to send out changeover control data to connect the input/output terminal y of the switch 20 to that $x_2$ thereof. The processor then proceeds to a step S2" to command the optical recording disk driver 45 to read information in a recording position in which a keyword, or directory or the like for retrieving initial video data is previously recorded. The processor then proceeds to a step S2''' to judge whether or not a control signal indicating that data are sent out from the optical recording disk driver 45 is being sent out. When it is judged in a step S2''' that the control signal is not being sent out, the processor performs step S2''' again. When it is judged in the step S''' that the control signal is being sent out, the processor proceeds to a step S'''' to store disk data in a prescribed region of the RAM of the system controller 40.

Figure 4:
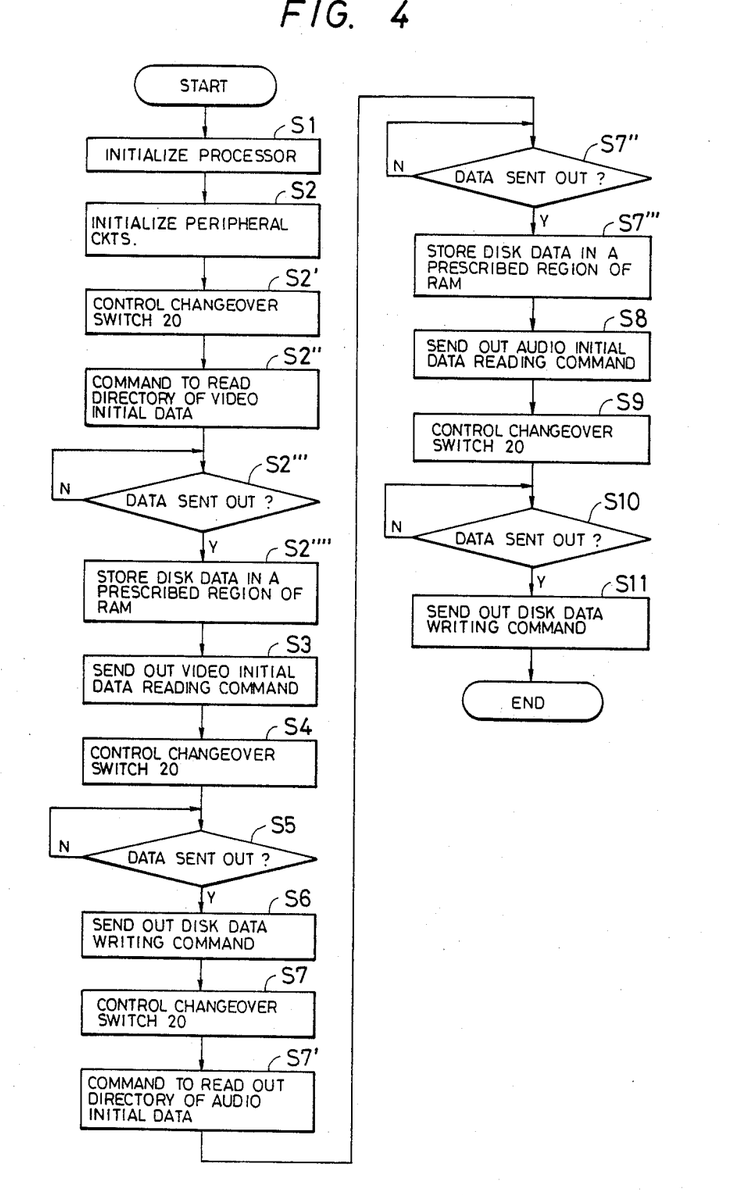
FIG. 4 shows a flow chart of the operation of the still picture recording/reproduction device at the time of application of power thereto.

After that, the processor proceeds to a step S3 to command the optical recording disk driver 45 to read information in a recording position in which the initial video data are previously recorded. The processor then proceeds to a step S4 to send out changeover control data to connect the input/output terminal y of the switch 20 to that $x_1$ thereof. The processor then proceeds to a step S5 to judge whether or not a control signal indicating that data from the optical recording disk driver 45 is being sent out. When it is judged in the step S5 that the control signal is not being sent out, the processor performs step S5 again. When it is judged in the step S5 that the control signal is being sent out, the processor proceeds to a step S6 to send out the disk data writing command to the video system timing controller 21.

After that, the processor proceeds to a step S7 to send out changeover control data to connect the input/output terminal y of the switch 20 to that $x_2$ thereof. The processor then proceeds to a step S7' to command to the optical recording disk driver 45 to read information in a recording position in which a keyword, directly or the like for retrieving initial audio data is previously recorded. The processor then proceeds to a step S7''' to judge whether or not a control signal indicating that data from the optical recording disk driver 45 is being sent out. When it is judged in the step S7'' that the control signal is not being sent out, the processor performs step S7'' again. When it is judged in the step S7'' that the control signal is being sent out, the processor proceeds to a step S7''' to store disk data in a prescribed region of the RAM of the system controller 40.

After that, the processor proceeds to a step S8 to command the optical disk driver 45 to read information in a recording position in which the initial audio data are previously stored, The processor then proceeds to a step S9 to send out changeover control data to connect the input/output terminal y of the switch 20 to that $x_3$ thereof. The processor then proceeds to a step S10 to judge whether or not a control signal indicating that data from the optical recording disk driver 45 is being sent out. When it is judged in the step S10 that the control signal is not being sent out, the processor performs step S10 again. When it is judged in the step S10 that the control signal is being sent out, the processor proceeds to a step S11 to send out the disk data writing command to the audio system timing controller 22 to start executing another routine.

Through the above-described operation, the memories are set in an initial state by data previously recorded in a prescribed recording position on the disk 57, so that a still picture indicating data peculiar to the disk is reproduced.

Although FIG. 4 shows that a single kind of data for initial setting is recorded on a single disk, it may be performed that a plurality of kinds of data are recorded on a single disk. These plurality of kinds of data may be provided with numbers or data to carry out initial setting by any of the following methods: manipulation of keys by the user of the still picture recording/reproduction device, the state of a switch having a plurality of contacts, data recorded on the disk or the like.

Figure 5:
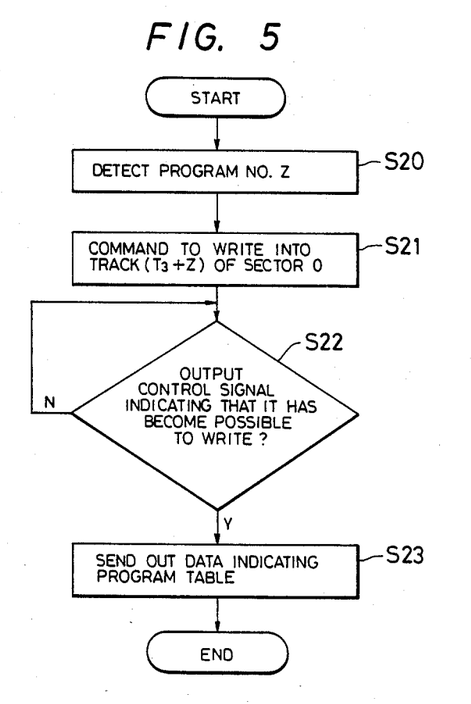
FIG. 5 shows a flow chart of the operation of the still picture recording/reproduction device at the time of loading of a program.

When a program save command is applied by the manipulation of the keys of the control panel 41 during the execution of a main routine, the processor proceeds to a step S20 to detect the program save a command and a program number Z set by the manipulation of the keys. The processor then proceeds to step S21 to send out a command to the optical recording disk driver 45 to perform writing in the track $(T_3+Z)$ of the sector 0 of the disk 57. The processor then proceeds to a step S22 to judge whether or not a control signal indicating that it has become possible write data through the optical recording disk driver 45 is being sent out. When it is judged in the step S22 that the control signal is not being sent out, the processor proceeds to a step S23 so that data indicating a program table stored in a prescribed region of the RAM of the system controller 40 are sent out to the optical recording disk drive 45 to resume the execution of the main routine.

Through the above-described operation, the data indicating the program table stored in the prescribed region of the RAM of the system controller 40 are written in a position which extends from the track $(T_3+Z)$ of the sector 0 of the disk 57.

Figure 8:
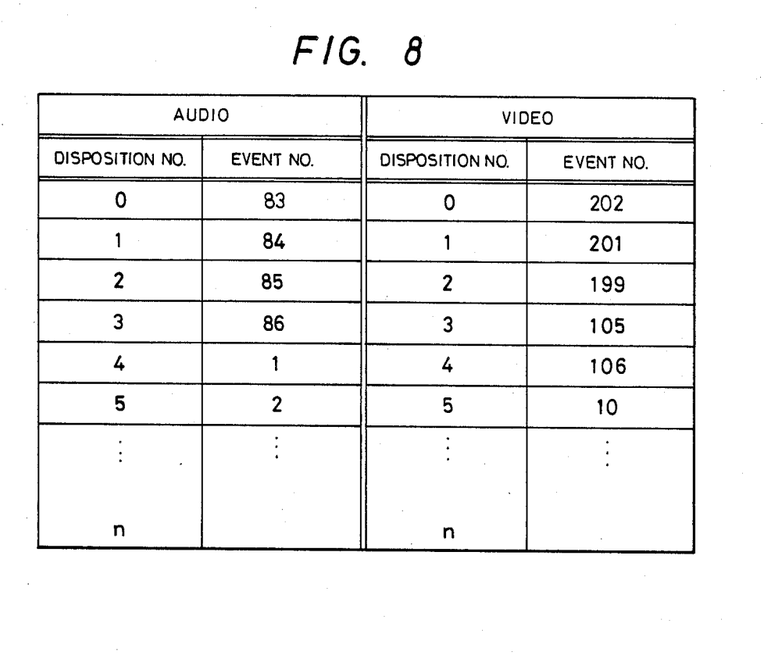
FIG. 8 shows a program table.
Figure 9:
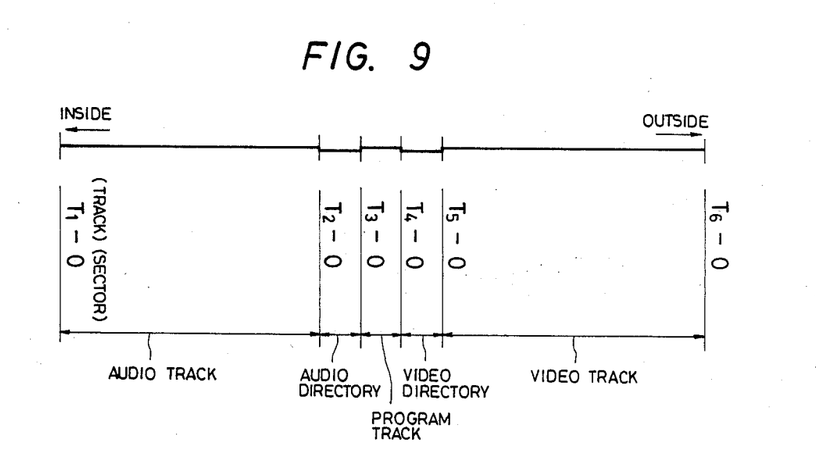
FIG. 9 shows the allocation of recording regions of a disk.

A program table such as shown in FIG. 8 can be previously stored in a prescribed region of the RAM of the system controller 40 by the manipulation of the keys of the controller panel 41, so that a program for reproducing recorded information in a described sequence is stored nearly in the middle of the recording area of the disk 57 as as shown in FIG. 9. The instruction data of the program can thus be prevented from being wrongly applied due to a scratch, a contamination or the like, made by the contact of a disk clamping mechanism, the finger of the user or the like.

FIG. 9 shows a region which extends from the track $T_1$ of the sector 0 and in which audio information is stored, a region which extends from the track $T_2$ of the sector 0 and in which a keyword, directory or the like for retrieving the audio information is stored, a region which extends from the track $T_3$ of the sector 0 and in which a program is stored, a region which extends from the track $T_4$ of the sector 0 and in which a keyword, directory or the like for retrieving video information is stored, and a region which extends from the track $T_5$ of the sector 0 and in which the video information is stored.

When audio information with an event number X is to be recorded on disk 57, the track $(T_1+10X)$ of the sector 0 of the disk is appointed as the position of start of the recording. When a keyword, directory or the like for retrieving the audio information with the event number X is to be recorded on the disk 57, the track $(T_2+X)$ of the sector 0 of the disk is appointed as the position of start of the recording. When video information with an event number Y is to be recorded on the disk 57, the track $(T_5+10Y)$ of the sector 0 of the disk is appointed as the position of start of the recording. When a keyword, directory or the like for retrieving the video information with the event number Y is to be recorded on the disk 57, the track $(T_4+Y)$ of the sector 0 of the disk is appointed as the position of start of the recording.

Figure 6:
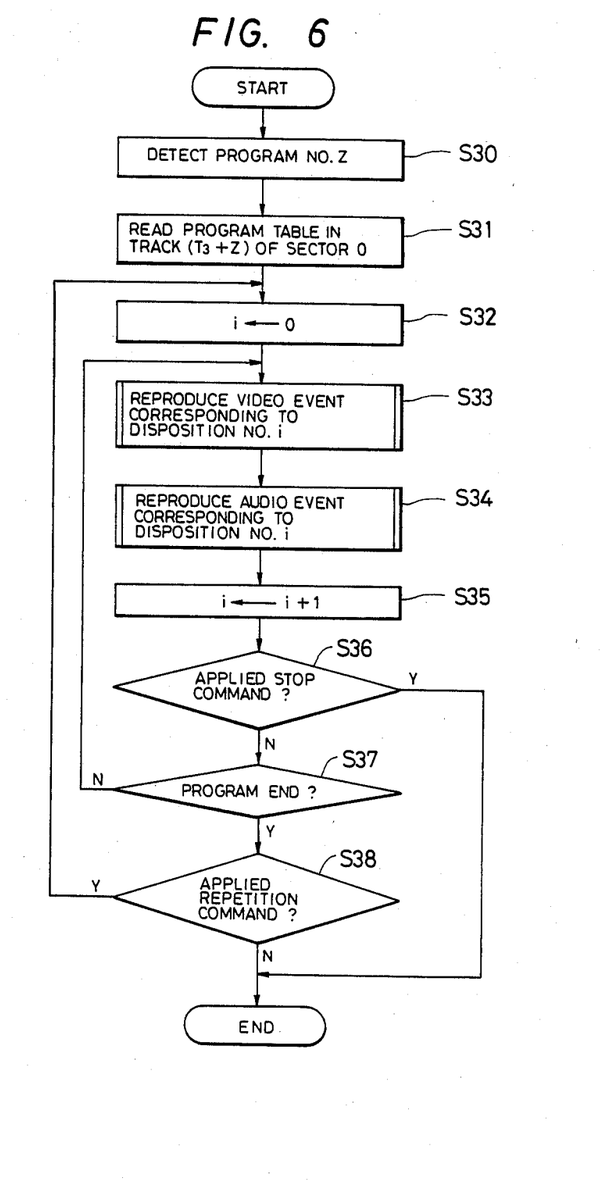
FIG. 6 shows a flow chart of the operation of the still picture recording/reproduction device at the time of start of execution of the program.

When a program start command is applied during the execution of the main routine, the processor proceeds to a step S30 to detect the program start command and the program number Z appointed by the manipulation of the keys of the control panel 41. The processor then proceeds to a step S31 so that a command for reading the data stored in the track $(T_3+Z)$ of the sector 0 of the disk 57 is sent out to the Optical recording disk driver 45 to obtain the program table corresponding to the program number Z and write the program table in the prescribed region of the RAM of the system controller 40. The processor then proceeds to a step S32 so that the content in an address in which a disposition number i which is stored in the RAM of the system controller 40 is made zero.

After that, the processor proceeds to a step S33 to call a subroutine R1 to reproduce a video event corresponding to the disposition number i. The processor then proceeds to a step S34 to call a subroutine R2 to reproduce an audio event corresponding to the disposition number i. The processor then proceeds to a step S35 to add 1 to the content in the address in which the disposition number i is stored.

After that, the processor proceeds to a step S36 to judge whether or not a stop command is being applied by the manipulation of the keys of the control panel 41. When it is judged in the step S36 that the stop command is being applied, the processor resumes the execution of the main routine. When it is judged in the step S36 that the stop command is not being applied, the processor proceeds to a step S37 to judge whether or not data indicating a program end are stored in a position corresponding to the disposition number i. When it is judged in the step S37 that the data indicating the program end are not stored in the position, the processor proceeds to the step S33. When it is judged in the step S37 that the data indicating the program end are stored in the position, the processor proceeds to a step S38 to judge whether or not a repetition command is being applied by the manipulation of the keys of the control panel 41. When it is judged in the step S38 that the repetition command is being applied by the manipulation of the keys of the control panel 41, the processor proceeds to the step S32. When it is judged in the step S38 that the repetition command is not being applied by the manipulation of the keys of the control panel 41, the processor resumes the execution of the main routine.

Figure 7:
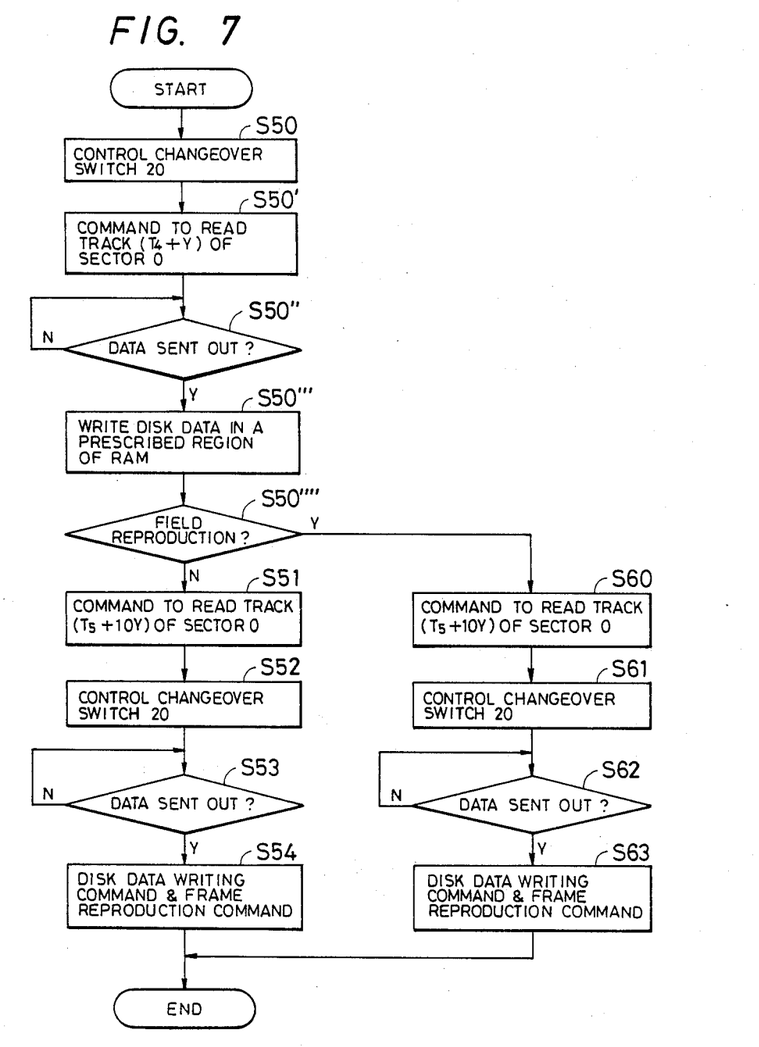
FIG. 7 shows a flow chart of the operation of the still picture recording/reproduction device at the time of reproduction of an event.

After the subroutine R1 is called in the step S33 as shown in the flow chart in FIG. 6, the processor proceeds to a step S50 to send out changeover control data to connect the input/output terminal y of the switch 20 to terminal $x_2$ thereof. The processor then proceeds to a step S50' so that a command for reading information recorded in a recording position (the track $(T_4+Y)$ of the sector 0 in which a keyword, directory or the like for retrieving the number Y of the video event corresponding to the disposition number i which is recorded is sent out to the optical recording disk driver 45. The processor then proceeds to a step S50" to judge whether or not a control signal indicating that data are sent out from the optical recording disk driver 45 is being sent out. When it is judged in the step S50" that the control signal is not being sent out, the processor performs step S50" again. When it is judged in the step S50" that the control signal is being sent out, the processor proceeds to a step S50''' to store disk data in a prescribed region of the RAM of the system controller 40. The processor then proceeds to a step S50''' to judge whether or not field reproduction is commanded by a frame/field discrimination flag added to the content in the recording position ($T_4+Y$), in which the keyword, directory or the like for retrieving the video event Y corresponding to the disposition number i in the program is stored. When it is commanded by the frame/field discrimination flag, the processor proceeds to a step S51 so that a command for reading information recorded in a recording position (the track ($T_5+10Y$) of the sector 0) in which the number Y of the video event corresponding to the disposition number i which is recorded is sent out to the optical recording disk driver 45. The processor then proceeds to a step S52 to send out changeover control data to connect the input/output terminal y of the switch 20 to terminal $x_1$ thereof. The processor then proceeds to a step S53 to judge whether or not a control signal indicating that data from the optical recording disk driver 45 is being sent out. When it is judged in the step S53 that the control signal is not being sent out, the processor performs step S53 again. When it is judged in the step S53 that the control signal is being sent out, the processor proceeds to a step S54 to send out the disk data writing command to the video system timing controller 21 resume the execution of a routine being executed immediately before proceeding to the step S50.

When it is judged in the step S50'''' that the field reproduction is commanded, the processor proceeds to a step S60. In the steps S60, S61 and S62, the same processing as the steps S51, S52 and S53 is performed. When it is judged in the step S62 that a control signal indicating that data from the optical recording disk driver 45 is being sent out, the processor proceeds to a step S63 to send out the disk data writing command and a field reproduction command to the video system timing controller 21 to resume the execution of the main routine.

Through the above-described operation, events are reproduced in the sequence of disposition numbers in the program table as shown in FIG. 8. If the field reproduction is commanded by the frame/field discrimination flag (which is added to the content in the recording position ($T_4+Y$) in which the keyword, directory or the like for retrieving the video event Y corresponding to the disposition number i in the program is stored), a still picture is reproduced by writing an amount of data for a field into the memory. For that reason, the desired still picture is reproduced by writing an amount of data for a frame into the memory and thereafter, repeatedly reading the data from the memory. For that reason, the still picture of high definition can be obtained. Thus, the frame reproduction or the field reproduction can be freely chosen for each still picture being continuously reproduced.

When a still picture is to be reproduced alone, the processor judges whether or not field reproduction is commanded by the manipulation of the keys of the control panel 41, to enable the same free choice as mentioned above.

Finally, it should be understood that one of the steps S33 and S34 shown in FIG. 6 may be eliminated to reproduce only one of the audio event and the video event.

In an initial state setting system for a still picture recording/reproduction device, data including prescribed video information are previously recorded in a prescribed recording position on a recording disk. The data previously recorded in the prescribed recording position are read and written into a still picture reproduction memory immediately after the application of electric power to the device so as to set the stored contents of the memory in an initial state. The data corresponding to a pattern including information peculiar to the recording disk and concerning the type, performance and the like of the disk can thus be previously recorded in the prescribed recording position to reproduce the pattern as a still picture immediately after the application of electric power to the device.

I claim:

1. An initial state setting system for a still picture recording/reproduction device, said device being operable upon an application of electric power thereto, the system comprising:

disk recording/reproduction means for recording video information on a recording disk and for reproducing the recorded video information from said recording disk;

memory means for storing video information;

means for writing into said memory means the video information reproduced from the recording disk by said disk recording/reproduction means; and means for thereafter repeatedly reading the video information written in said memory means to reproduce a still picture;

wherein the disk further includes data recorded thereon which represents a particular location on the disk where specified video information is recorded; and wherein said writing means and reading means are operable, upon the application of electric power to said device, for initially writing into and reading from said memory means the specified video information corresponding to the particular location of the disk, thereby setting contents of said memory means in an initial state.

2. An initial state setting system as recited in claim 1, wherein the disk further includes a program recorded thereon for retrieving video information recorded on other locations of said recording disk.

3. An initial state setting system as recited in claim 2, wherein said other locations of the disk are disposed on a peripheral side of said recording disk and said video information is recorded adjacent said other locations.

4. An initial state setting system as recited in claim 1, wherein said disk recording/reproduction means selectively records a video input signal and an audio input signal in appointed recording positions on said recording disk.

5. An initial state setting system as recited in claim 1, wherein said data indicates one of a plurality of types of recording disks.

* * * * *